(12) United States Patent
Kim

(10) Patent No.: US 7,894,005 B2
(45) Date of Patent: Feb. 22, 2011

(54) STEREOSCOPIC DISPLAY DEVICE UTILIZING A LIQUID CRYSTAL PARALLAX BARRIER

(75) Inventor: Ju-Han Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/581,027

(22) Filed: Oct. 16, 2009

(65) Prior Publication Data

US 2010/0033642 A1 Feb. 11, 2010

Related U.S. Application Data

(62) Division of application No. 11/167,597, filed on Jun. 28, 2005, now Pat. No. 7,609,330.

(30) Foreign Application Priority Data

Dec. 30, 2004 (KR) .......................... 2004-00116867

(51) Int. Cl.
  *G02F 1/1333* (2006.01)
  *G02B 27/22* (2006.01)
  *H04N 13/04* (2006.01)

(52) U.S. Cl. .............................. 349/15; 345/6; 348/51; 348/52; 349/74; 349/38; 349/149; 359/482

(58) Field of Classification Search .................. 349/15, 349/74, 138; 359/462, 463; 348/51–52; 345/6

See application file for complete search history.

(56) References Cited

U.S. PATENT DOCUMENTS

| 4,277,786 A | 7/1981 | Waldron |
| 5,969,850 A | 10/1999 | Harrold et al. |
| 6,049,424 A * | 4/2000 | Hamagishi ................. 359/464 |
| 7,154,653 B2 | 12/2006 | Kean et al. |
| 2002/0063843 A1 | 5/2002 | Yu et al. |
| 2002/0075439 A1 * | 6/2002 | Uehara ....................... 349/149 |
| 2003/0122982 A1 | 7/2003 | Shin et al. |
| 2004/0252269 A1 | 12/2004 | Murade |
| 2005/0237466 A1 | 10/2005 | Chung |
| 2006/0215262 A1 | 9/2006 | Kim |

FOREIGN PATENT DOCUMENTS

| JP | 2004-287440 | 10/2004 |
| JP | 2005-164916 | 6/2005 |
| JP | 2006-189766 | 7/2006 |

* cited by examiner

*Primary Examiner*—David Nelms
*Assistant Examiner*—Jessica M Merlin
(74) *Attorney, Agent, or Firm*—Morgan, Lewis & Bockius LLP

(57) ABSTRACT

A parallax barrier liquid crystal panel for a stereoscopic display device, including a first substrate including an active region and a non-active region, a second substrate facing the first substrate, first, second, and third lines in the non-active region, at least one barrier electrode in the active region and connected to the first line, at least one pair of first and second transmission electrodes disposed adjacent to the barrier electrode and connected to the second and third lines, respectively, a common electrode on the second substrate, and a liquid crystal layer between the first and second substrates.

3 Claims, 13 Drawing Sheets

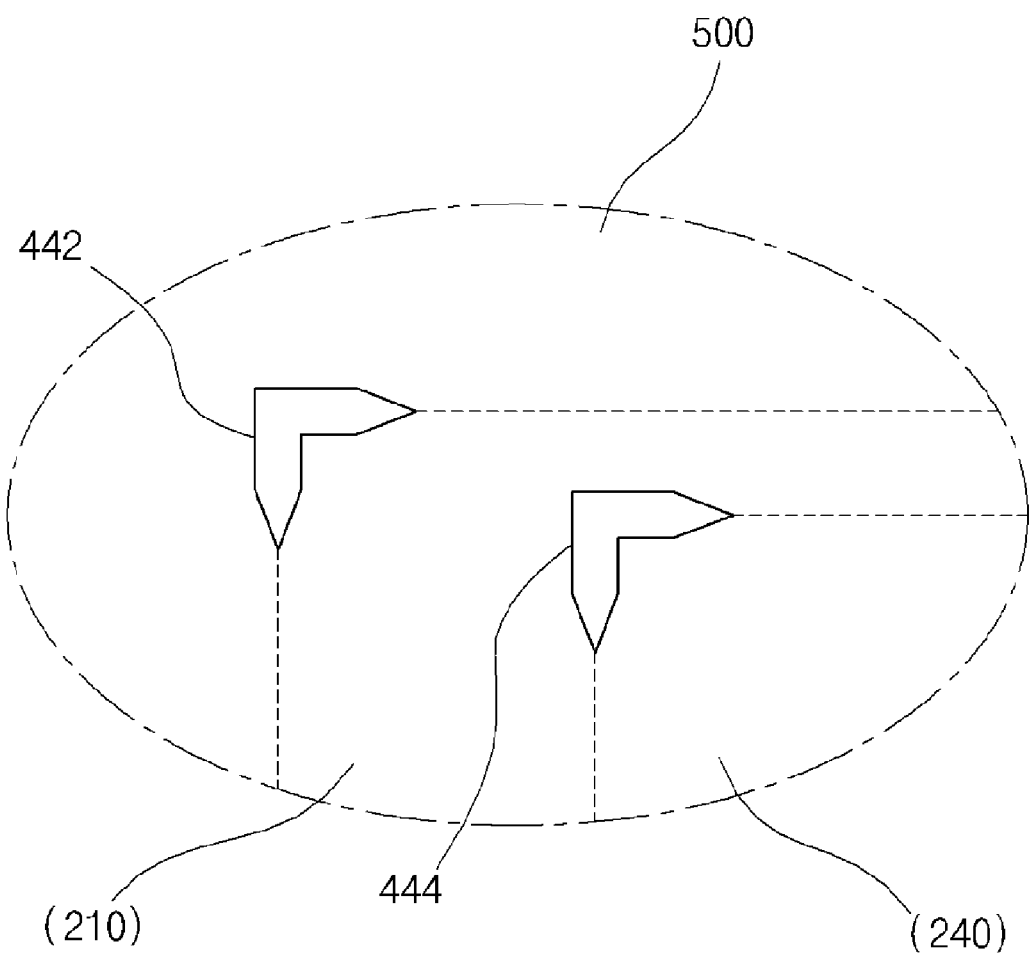

STEREOSCOPIC DISPLAY DEVICE UTILIZING A LIQUID CRYSTAL PARALLAX BARRIER

This application is a divisional of U.S. patent application Ser. No. 11/167,597, filed Jun. 28, 2005 now U.S. Pat. No. 7,609,330, and also claims the benefit of Korean Patent Application No. 2004-0116867 filed in Korea on Dec. 30, 2004, both of which are hereby incorporated by reference.

BACKGROUND OF THE INVENTION

1. Field of Invention

The present invention relates to a liquid crystal panel, and more particularly, to a parallax barrier liquid crystal panel for a stereoscopic display device and a fabrication method thereof.

2. Description of Related Art

To present, two-dimensional (2-D) devices have predominantly been used to convey information. Recently, three-dimensional (3-D) display devices have emerged from research and development as broadband communication networks allow high-speed delivery of large amounts of information.

In general, 3-D display devices display stereoscopic images using stereo vision principles. Parallax of vision perceived by both eyes is the primary key in displaying 3-D images. When the right eye and the left eye each see a 2-D image, the 2-D image perceived by each respective eye is transferred to the brain. The brain combines the two 2-D images into a 3-D image having depth, making the image look "real."

Based upon the above principle, various display devices have been used to display 3-D images using 2-D images. For instance, stereoscopic display devices with specially designed glasses, stereoscopic display devices without the need for glasses, holographic display devices, and the like, have been developed. The disadvantages of stereoscopic display devices with specially designed glasses are numerous. Need for the specially designed glasses to see the 3-D image makes use of such devices inconvenient. The glasses themselves are generally uncomfortable to wear and feel unnatural.

Holographic display devices also pose disadvantages. Holographic display devices use laser beams to generate the 3-D image. Holographic display devices are generally large and expensive requiring large amounts of space. In contrast, stereoscopic display devices without special glasses use generally simple equipment and do not require separate accessories (i.e., specialized glasses). These stereoscopic display devices without glasses are generally divided into three categories: a parallax barrier type, a lenticular type and an integral photography type. Of these types, the parallax barrier type has been mainly used.

FIG. 1 shows a cross-sectional view illustrating a parallax barrier type stereoscopic display device according to the related art. As shown in FIG. 1, the parallax barrier type stereoscopic display device includes a liquid crystal display panel 10, a backlight 20 below the liquid crystal display panel 10, and a parallax barrier 30 between the liquid crystal display panel 10 and an observer 40. A left eye pixel L and a right eye pixel R are alternately formed in the liquid crystal display panel 10. A slit 32 and a barrier 34 are alternately formed in the parallax barrier 30. Each of the slits 32 and the barriers 34 form a stripe pattern. When light is emitted from the backlight 20, first light L1 passing through the left eye pixel L goes to the observer's left eye through the slit 32, while second light R1 passing through the right eye pixel R goes to the observer's right eye through the slit 32. Images displayed through the left and right eye pixels L and R have parallax information that humans can sufficiently perceive. Thus, the observer 40 sees 3-D images. However, since the slits 32 and barriers 34 are fixed, parallax barrier type display devices are used only for displaying 3-D images. Accordingly, stereoscopic display devices that switch between a 2-D mode and a 3-D mode have been developed.

FIGS. 2A and 2B are cross-sectional views illustrating a 2-D mode and a 3-D mode, respectively, of a stereoscopic display device having a parallax barrier liquid crystal panel according to the related art. As shown in FIGS. 2A and 2B, the stereoscopic display device includes a backlight 50, a main liquid crystal panel 60, and a parallax barrier liquid crystal panel 70 between the backlight 50 and the main liquid crystal panel 60. The main liquid crystal panel 60 includes first and second substrates 64 and 66, and a first liquid crystal layer 62 between the first and second substrates 64 and 66. Though not shown in the drawings, a plurality of pixel electrodes and thin film transistors (TFTs) are disposed in a matrix form on the first substrate 64, and a plurality of color filter patterns, a black matrix and a first common electrode are disposed on the second substrate 66.

The parallax barrier liquid crystal panel 70 includes third and fourth substrates 74 and 78, and a second liquid crystal layer 72 between the third and fourth substrates 74 and 78. A barrier electrode 76 having a stripe pattern is disposed on the third substrate 74, and a second common electrode 80 is disposed on the fourth substrate 78. The barrier electrode 76 and the common electrode 80 are transparent. First, second, and third polarizing plates 82, 84, and 86 are formed on the second substrate 66, between the main liquid crystal panel 60 and the parallax barrier liquid crystal panel 70, and below the third substrate 74, respectively.

In a 2-D mode, the parallax barrier liquid crystal 70 is in a white state when the parallax barrier liquid crystal panel 70 is driven in a normally white (NW) mode. When in a 2-D mode, as shown in FIG. 2A, no driving voltage is applied to the barrier electrode 76. Thus, the entirety of parallax barrier liquid crystal panel 70 is in a normally white state. Accordingly, all of the light emitted from the back light 50 is transmitted through the parallax barrier liquid crystal panel 70. As a result, an observer can see plane images (i.e., 2-D images) of the main liquid crystal panel 60.

In a 3-D mode, as shown in FIG. 2B, on the other hand, a driving voltage is applied to the barrier electrode 76, thus activating the second liquid crystal layer 72 between the barrier electrode 76 and the second common electrode 80. Accordingly, various zones of the parallax barrier liquid crystal panel 70 corresponding to the barrier electrode 76 shield light emitted from the backlight 50. Each of these light-shielded zones is referred to as a barrier-zone BZ having a black state. The zones between the barrier-zones BZ transmit light emitted from the backlight 50. Each of these light-transmitting zones is referred to as a transmission zone TZ having a white state. The barrier-zones BZ and the transmission-zones TZ act as a barrier and a slit, respectively, as the parallax barrier 30 shown in FIG. 1. Accordingly, a user can selectively convert the stereoscopic display device between a 2-D mode and a 3-D mode based on the On/Off states of the barrier electrode 76 by selecting a dimension mode. As a result, an observer can view 2-D images (i.e., plane images) and 3-D images (i.e., stereo images) from the same main liquid crystal display panel 60.

FIG. 3 is a cross-sectional view illustrating another stereoscopic display device having a parallax barrier liquid crystal panel according to the related art. Detailed explanations of parts already shown in FIGS. 2A and 2B will be omitted. FIG. 3 shows a stereoscopic display device including a main liquid crystal panel 60, a backlight 50, and a parallax barrier liquid crystal panel 70 similar to the stereoscopic display device of FIGS. 2A and 2B. However, the parallax barrier liquid crystal panel 70 of FIG. 3 is structurally different than the parallax barrier liquid crystal panel 70 of FIGS. 2A and 2B. In particular, partition walls 90 composed of transparent photo acryl, for example, are formed in transmission-zones TZ between the barrier-zones BZ of the liquid crystal layer 72. Accordingly, a boundary between the transmission-zones TZ and the barrier-zones BZ is distinctly defined when the stereoscopic display device selectively displays a 2-D image and a 3-D image.

As explained above, the related art stereoscopic display devices having the parallax barrier liquid crystal panel have certain advantages, such as the ability to selectively switch between a 2-D mode and a 3-D mode. However, the disadvantages of the related art stereoscopic display devices include low brightness and low sensory resolution in the 3-D mode. As the width of the transmission-zones TZ decrease, the sensory resolution increases. However, as a width of the transmission-zones TZ decrease, the aperture ratio also decreases, thereby reducing the brightness.

FIG. 4 is a conceptual plan view illustrating a screen in a 3-D mode of the related art stereoscopic display device having a parallax barrier liquid crystal panel. Characters R, G, and B represent red, green, and blue pixels of the main liquid crystal panel. As shown in FIG. 4, the width of a transmission-zone TZ is very small. Accordingly, the aperture ratio and the brightness of the display drastically decrease as the areas of the transmission-zones TZ are reduced. A corollary to this effect is that the sensory resolution decreases as the areas of the transmission-zones TZ are enlarged to increase the aperture ration and the brightness. As a result, the stereoscopic display device of the related art is structurally limited in displaying 3-D images due to reduced sensory resolution in maintaining some degree of brightness.

SUMMARY OF THE INVENTION

Accordingly, the present invention is directed to a parallax barrier liquid crystal panel for a stereoscopic display device that substantially obviates one or more of problems due to limitations and disadvantages of the related art.

An object of the present invention is to provide a parallax barrier liquid crystal panel for a stereoscopic display device and a fabrication method thereof that improves brightness.

An another object of the present invention is to provide a parallax barrier liquid crystal panel for a stereoscopic display device and a fabrication method thereof that improves sensory resolution.

An another object of the present invention is to provide a parallax barrier liquid crystal panel for a stereoscopic display device and a fabrication method thereof that offer stereoscopic images having depth and reality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a parallax barrier liquid crystal panel for a stereoscopic display device includes a first substrate including an active region and a non-active region, a second substrate facing the first substrate, first, second, and third lines in the non-active region, at least one barrier electrode in the active region and connected to the first line, at least one pair of first and second transmission electrodes disposed adjacent to the barrier electrode and connected to the second and third lines, respectively, a common electrode on the second substrate, and a liquid crystal layer between the first and second substrates.

In another aspect, a method of fabricating a parallax barrier liquid crystal panel for a stereoscopic display device includes forming first, second, and third lines on a first substrate including an active region and a non-active region, forming a first insulator on the first, second, and third lines, the first insulator including at least one first contact hole exposing the first line, forming at least one barrier electrode on the first insulator, the barrier electrode connected to the first line through the first contact hole, forming a second insulator on the barrier electrode, the second insulator including at least one pair of second and third contact holes exposing the second and third lines, respectively, forming at least one pair of first and second transmission electrodes on the second insulator, the first transmission electrode connected to the second line through the second contact hole and the second transmission electrode connected to the third line through the third contact hole, forming a second substrate including a common electrode, attaching the first and second substrates together, and scribing the first and second substrates.

In yet another aspect, a stereoscopic display device, including a liquid crystal display panel includes a parallax barrier liquid crystal panel including a first substrate including an active region and a non-active region, a second substrate facing the first substrate, first, second, and third lines in the non-active region, at least one barrier electrode in the active region and connected to the first line, at least one pair of first and second transmission electrodes disposed adjacent to the barrier electrode and connected to the second and third lines, respectively, a common electrode on the second substrate, and a liquid crystal layer between the first and second substrates, and a control circuit for selectively driving the stereoscopic display device in a two-dimensional (2-D) mode or a three-dimensional (3-D) mode, wherein the 2-D mode is selected when no driving voltage is applied to the first, second, and third lines, thereby placing the barrier electrode and the first and second transmission electrodes in a white state, and the 3-D mode is selected when a driving voltage is applied to the first line and alternatingly applied to the second and third lines, thereby placing the barrier electrode in a black state, and placing the first and second transmission electrodes alternating between a black state and a white state.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 16 and FIG. 17 are plan views enlarging portions M and N of FIG. 15, respectively.

DETAILED DESCRIPTION OF THE PREFERRED EMBODIMENTS

Reference will now be made in detail to the illustrated embodiments of the present invention, which are illustrated in the accompanying drawings.

Figure 1:
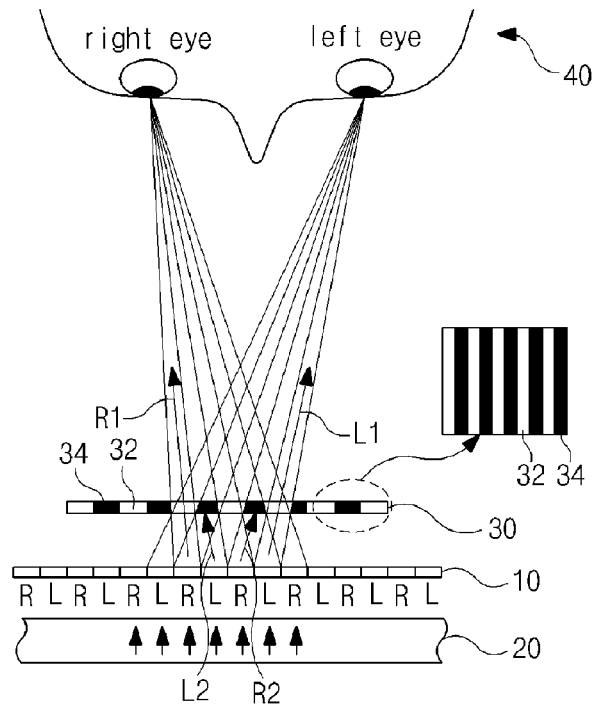
FIG. 1 is a cross-sectional view illustrating a parallax barrier type stereoscopic display device according to the related art.
Figure 2A:
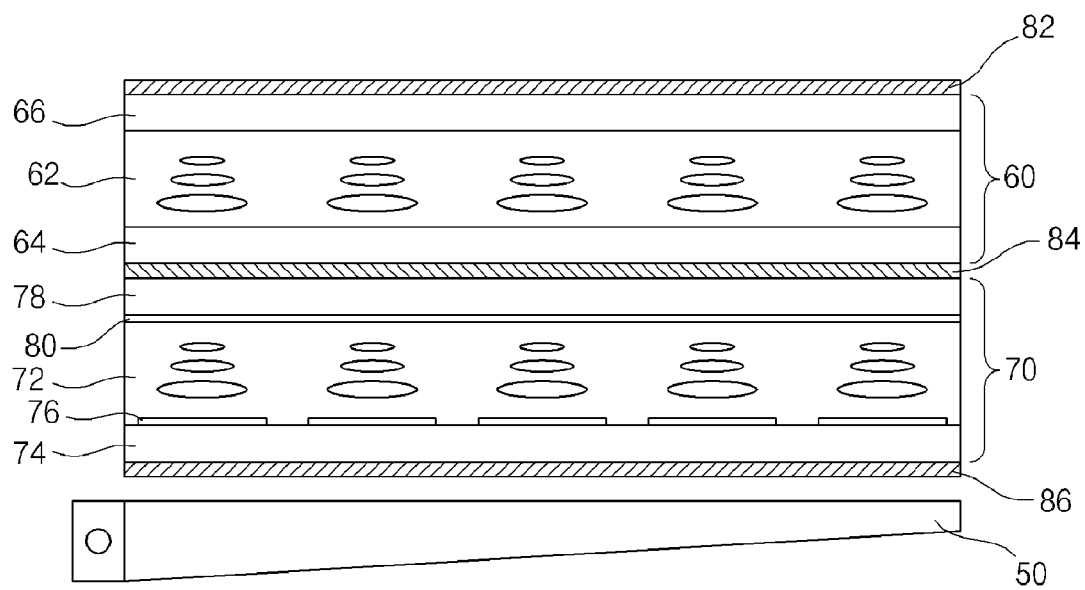
FIGS. 2A and 2B are cross-sectional views illustrating a 2-D mode and a 3-D, respectively, of a stereoscopic display device having a parallax barrier liquid crystal panel according to the related art.
Figure 2B:
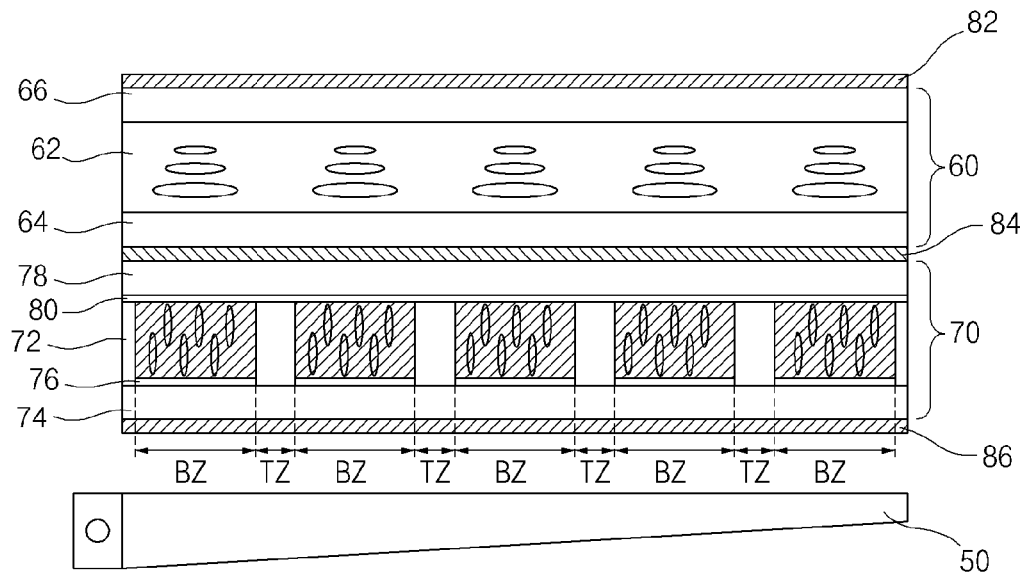
Figure 3:
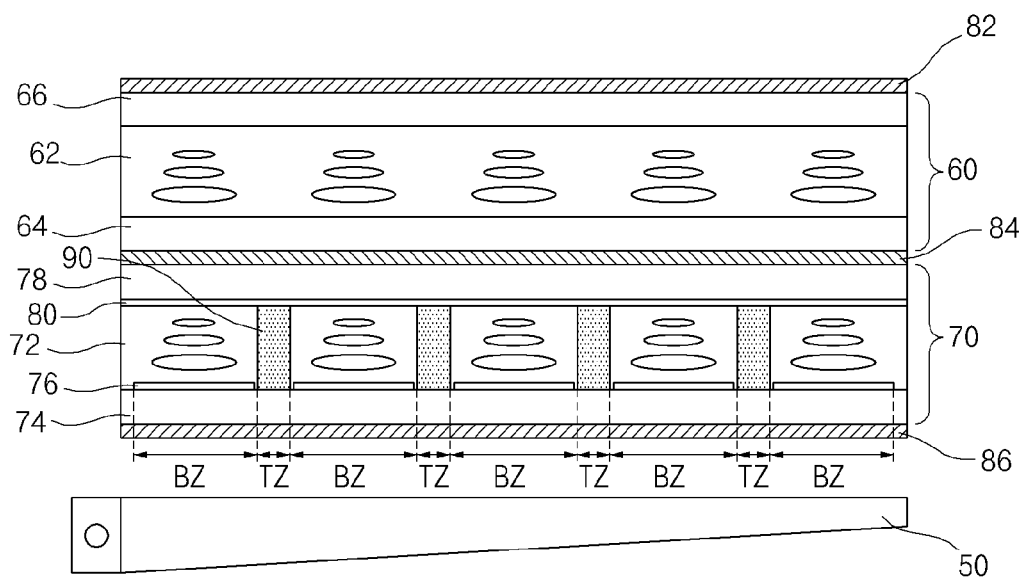
FIG. 3 is a cross-sectional view illustrating another stereoscopic display device having a parallax barrier liquid crystal panel according to the related art.
Figure 4:
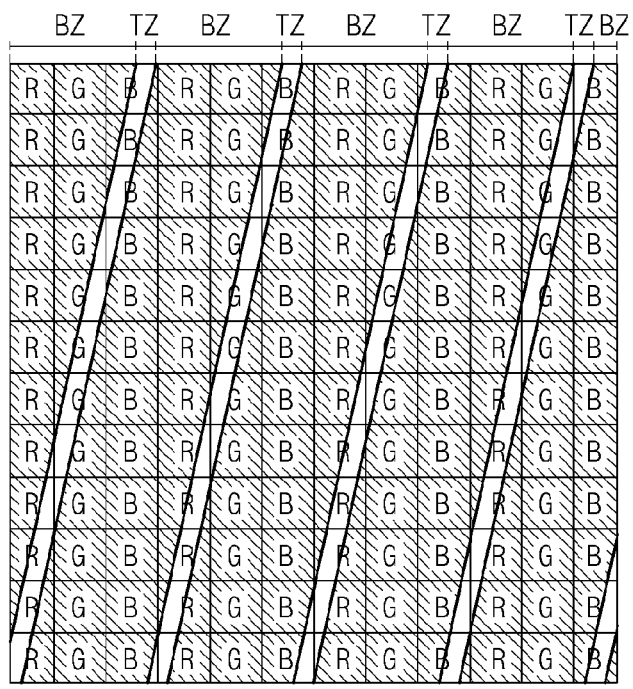
FIG. 4 is a conceptual plan view illustrating a screen in a 3-D mode of a stereoscopic display device having a parallax barrier liquid crystal panel according to the related art.
Figure 5:
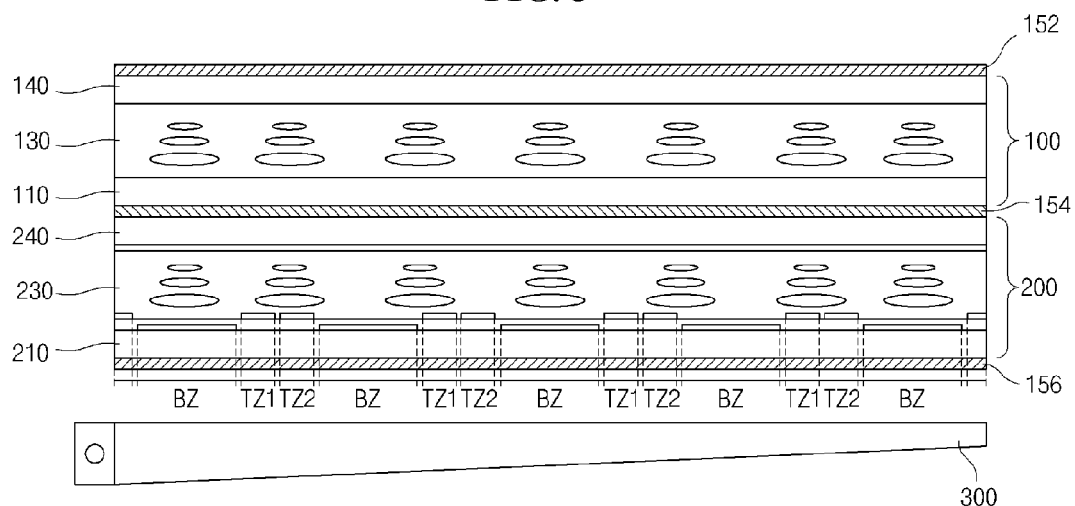
FIG. 5 is a cross-sectional view illustrating a stereoscopic display device according to a first exemplary embodiment of the present invention.

FIG. 5 is a cross-sectional view illustrating a stereoscopic display device according to a first exemplary embodiment of the present invention. As shown in FIG. 5, the stereoscopic display device includes a main liquid crystal panel 100 displaying plan images (i.e., 2-D images), a parallax barrier liquid crystal panel 200 below the main liquid crystal panel 100, and a backlight 300 below the parallax barrier liquid crystal panel 200. Though the parallax barrier liquid crystal panel 200 is disposed below the main liquid crystal panel 100 in FIG. 5, it should be understood that the parallax barrier liquid crystal panel may also be disposed above the main liquid crystal panel 100.

Figure 6:
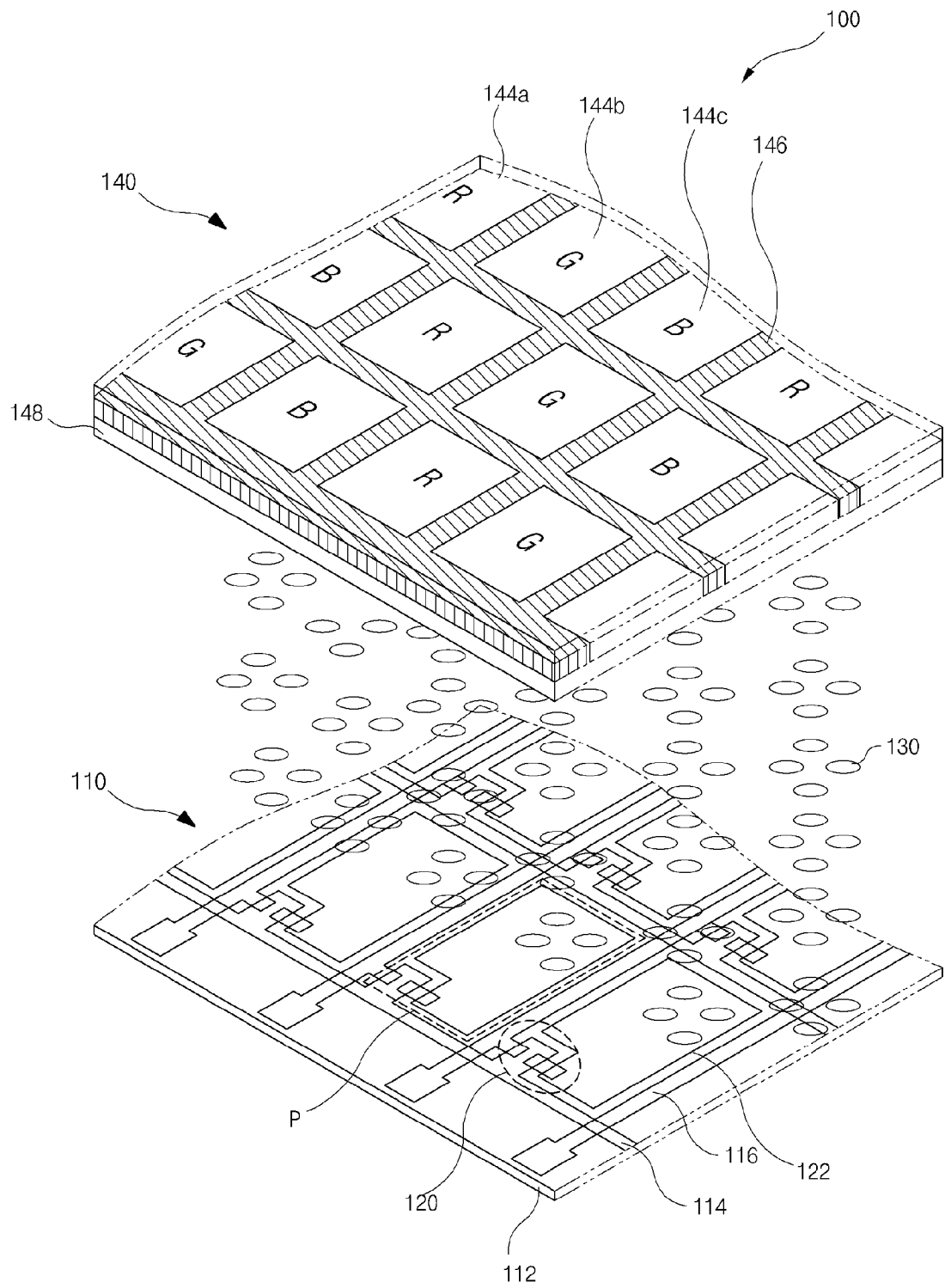
FIG. 6 is a perspective view illustrating a main liquid crystal panel according to the first exemplary embodiment of the present invention.

FIG. 6 is a perspective view illustrating the main liquid crystal panel 100 according to the first exemplary embodiment of the present invention. As shown in FIG. 6, the main liquid crystal panel 100 includes first and second substrates 110 and 140, and a first liquid crystal layer 130 between the first and second substrates 110 and 140. A plurality of gate and data lines 114 and 116 cross each other on the first substrate 110 to define a plurality of pixel regions P in a matrix form. A thin film transistor 120 is disposed near a crossing of each gate and data lines 114 and 116. The thin film transistor 120 is connected to a pixel electrode 122 in each pixel region P. A black matrix 146 below the second substrate 140 defines a plurality of openings corresponding to respective pixel regions P. Red (R), green (G), and blue (B) color filter patterns 144a, 144b and 144c are formed in respective openings. A first common electrode 148 is formed below the black matrix 146, and the red (R), green (G), and blue (B) color filter patterns 144a, 144b and 144c. Though not shown in the drawings, first and second alignment layers are formed on the pixel electrodes 122 and below the first common electrode 148, respectively, to align the first liquid crystal molecules.

The pixel electrode 122 and the first common electrode 148 face each other such that a voltage applied between the two electrodes induces an electric field across the first liquid crystal layer 130. Alignment of the liquid crystal molecules in the liquid crystal layer 130 changes in accordance with the intensity of the induced electric field into the direction of the induced electric field, thereby changing a light transmittance of the main liquid crystal panel 100. Further, each color filter 144a, 144c, or 144c filters the transmittance-changed white light to a light having the corresponding color i.e., red, green, or blue. Thus, the main liquid crystal panel 100 displays plan images (i.e., 2-D images) by varying the intensity of the induced electric field and by color-filtering.

As shown in FIG. 5, the parallax barrier liquid crystal panel 200 functions as a component selectively switching the stereoscopic display device between a 2-D mode and a 3-D mode. To do this, the parallax barrier liquid crystal panel 200 has a barrier-zone BZ and first and second transmission-zones TZ1 and TZ2. When the stereoscopic display device is operated to display images in a 2-D mode, light passes through all the zones of the parallax barrier liquid crystal panel 200, i.e., the barrier-zone BZ and the first and second transmission-zones TZ1 and TZ2. When the stereoscopic display device is operated to display images in a 3-D mode, light alternatingly passes through the first and second transmission-zones TZ1 and TZ2 but not through barrier-zone BZ. Particularly, each of the barrier-zone BZ shields light, and each of the first and second transmission-zones TZ1 and TZ2 alternates transmitting and shielding light. A state transmitting light is referred to as a "white state" while a state shielding light is referred to a "black state." Each of the barrier-zone BZ and the first and second transmission-zones TZ1 and TZ2 form a stripe pattern.

Figure 7:
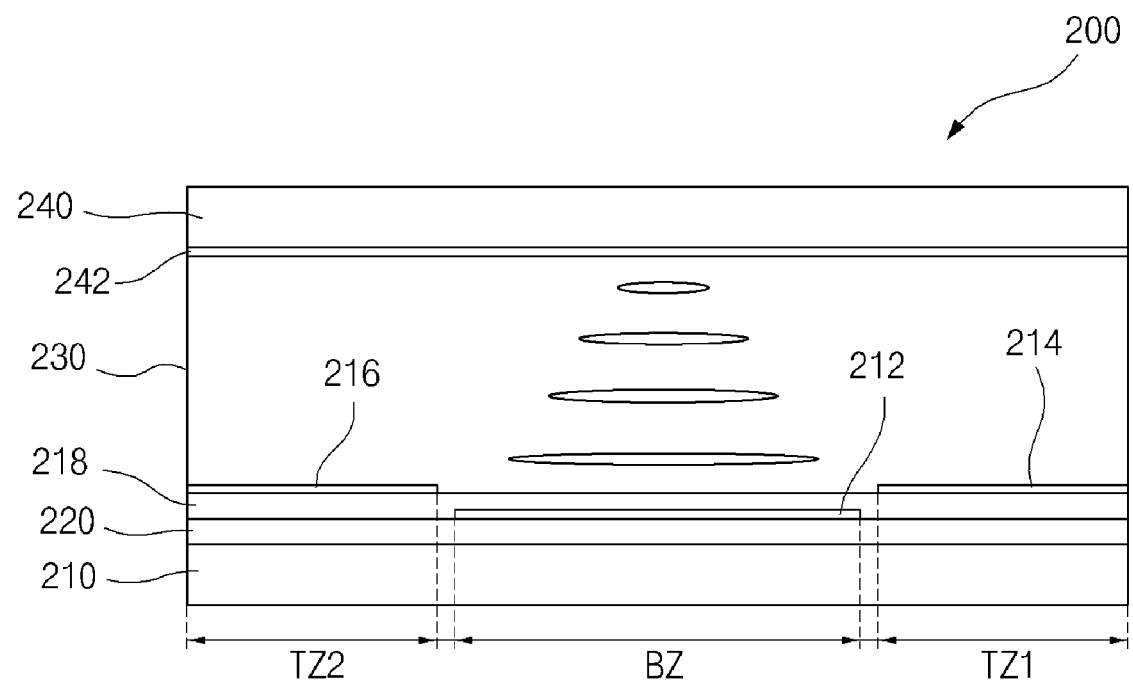
FIG. 7 is an enlarged cross-sectional view of a parallax barrier liquid crystal panel according to the first exemplary embodiment of the present invention.

FIG. 7 is an enlarged cross-sectional view of a portion of the parallax barrier liquid crystal panel according to the first exemplary embodiment of the present invention. As shown in FIG. 7, the parallax barrier liquid crystal panel 200 includes third and fourth substrates 210 and 240, and a second liquid crystal layer 230 between the third and fourth substrates 210 and 240. A barrier electrode 212, a first transmission electrode 214 and a second transmission electrode 216 are disposed on the third substrate 210. The barrier electrode 212, the first transmission electrode 214, and the second transmission electrode 216 correspond to the barrier-zone BZ, the first transmission-zone TZ1, and the second transmission-zone TZ2, respectively. Each of the barrier electrode 212, the first transmission electrode 214, and the second transmission electrode 216 form a stripe pattern. The first and second transmission electrodes 214 and 216 are disposed on each side portions of the barrier electrode 212. In other words, the first and second transmission electrodes 214 and 216 are disposed between adjacent barrier electrodes 212. A second common electrode 242 is disposed below the fourth substrate 240. Each of the barrier electrode 212, the first and second transmission electrodes 214 and 216, and the second common electrode 242 may be made of a transparent conductive material, such as indium-tin-oxide (ITO) and indium-zinc-oxide (IZO).

When the parallax barrier liquid crystal panel 200 is driven in a normally white (NW) mode, the parallax barrier liquid crystal panel 200 has a white state in a 2-D mode. When the stereoscopic display device is operated in a 2-D mode, no voltage is applied to the barrier electrode 212 and the first and second transmission electrodes 214 and 216. Accordingly, the parallax barrier liquid crystal panel 200 is in a normally white state, and thus light emitted from the back light 300 is transmitted through the barrier electrode 212 and the first and second transmission-zones TZ1 and TZ2. As a result, an observer can see plane images (i.e., 2-D images) on the main liquid crystal display panel 100.

On the contrary, when the stereoscopic display device is operated in a 3-D mode, a driving voltage is applied to the barrier electrode 212. Accordingly, the second liquid crystal layer 230 between the barrier electrode 212 and the first common electrode 242 is driven, and thus the barrier-zone BZ is in a black state. Further, a driving voltage is alternatingly applied to the first and second transmission electrodes 214 and 216. Thus, the first and second transmission-zones TZ1 and TZ2 alternates between white and black states. Preferably, the first and second transmission-zones TZ1 and TZ2 have states that are opposite to each other. In other words, when the first transmission-zone TZ1 is in a white state, the second transmission-zone TZ2 is in a black state, and vice versa. As a result, an observer can recognize flat images (i.e., 2-D images) displayed on the main liquid crystal panel 100 as stereo images (i.e., 3-D images) by using the parallax barrier liquid crystal panel 200. In a 3-D mode, the barrier-zone BZ may have a black state during one frame while the first and second transmission-zones TZ1 and TZ2 may have at least one alternating state.

First to third polarizing plates 152, 154, and 156 are formed on the second substrate 140, between the main liquid crystal panel 100 and the parallax barrier liquid crystal panel 200, and below the third substrate 210, respectively. (FIG. 5) If a twisted nematic liquid crystal is used for the first liquid crystal layer 130, the first and third polarizing plates 152 and 156 have the same polarizing characteristic, i.e., the same polarizing axis, and the second polarizing plate 154 has an opposite polarizing characteristic to the first and third polarizing plates 152 and 156, i.e., the opposite polarizing axis by 180°.

If the barrier electrode 212, the first transmission electrode 214, and the second transmission electrode 216 are disposed in the same layer, electric interference between the barrier electrode 212 and each of the transmission electrodes 214 and 216 abnormally aligns the second liquid crystal molecules 230 at each of the boundaries, thereby reducing quality of the displayed image. Accordingly, a first insulating layer 218 is disposed between the barrier electrode 212 and the transmission electrodes 214 and 216. A buffer layer 220 is disposed between the third substrate 210 and the barrier electrode 212.

Though not shown in the drawings, third and fourth alignment layers are formed on the transmission electrodes 214 and 216, and below the second common electrode 242, respectively, to align the second liquid crystal molecules 230.

In the parallax barrier liquid crystal panel 200 as shown in FIGS. 5 and 7, the barrier electrode 212 and the transmission electrodes 214 and 216 are on the third substrate 210. The transmission electrodes 214 and 216 are formed over the barrier electrode 212 layer, and the second common electrode 242 is below the fourth substrate 240. However, such vertical position relation of the barrier electrode, the transmission electrodes, and the common electrode as shown in FIG. 7 is only one example of a vertical position relation thereof and can therefore be modified.

Figure 8:
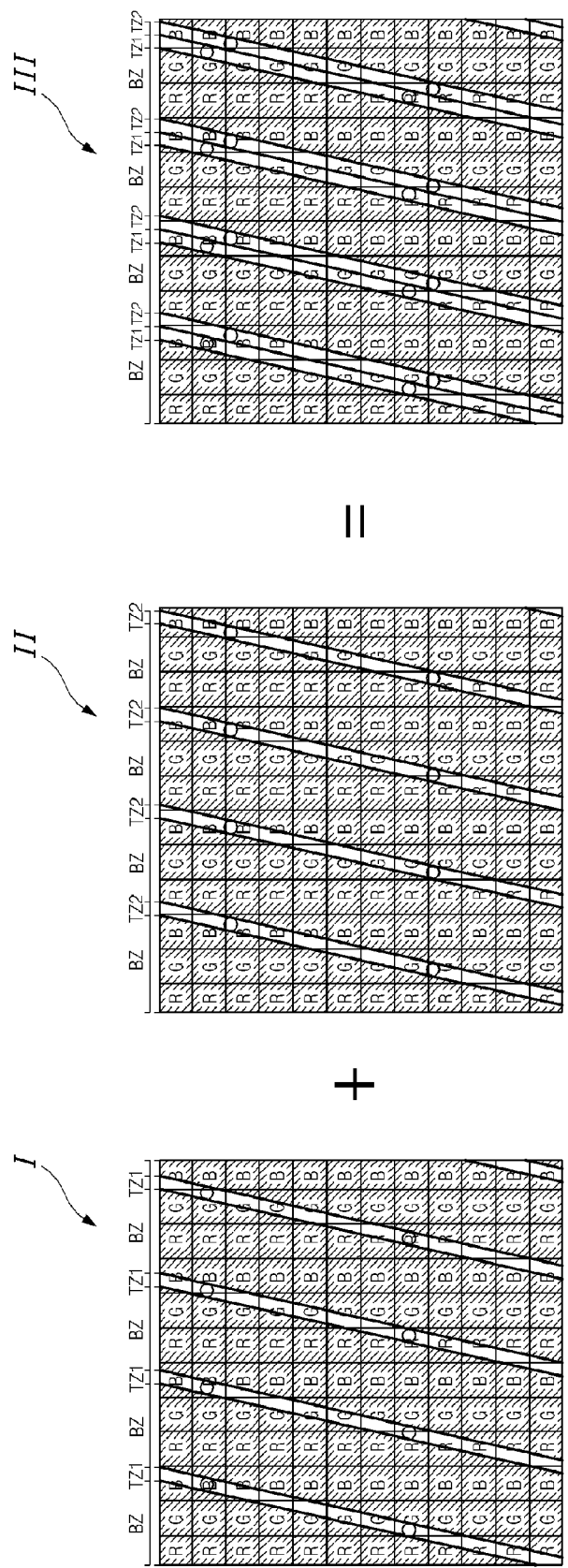
FIG. 8 is a conceptual view illustrating screens in a 3-D mode of a stereoscopic display device according to the first exemplary embodiment of the present invention.

FIG. 8 is a conceptual view illustrating screens displayed during operation of the stereoscopic display device according to the first exemplary embodiment of the present invention in a 3-D mode. As shown in FIG. 8, I, II, and III represent first, second and third screens. The first screen I is displayed in a first period when a first transmission-zone TZ1 has a white state, and a second transmission-zone TZ2 has a black state. The second screen II is displayed in a second period when the first transmission-zone TZ1 has a black state, and the second transmission-zone TZ2 has a white state. The third screen III is a mixed screen of the first and second screens I and II perceived by an observer. With respect to the number (or areas) of red (R), green (G), and blue (B) pixels having white states, the third screen III has pixels in a white state about by two times more than the first or second screen I or II. In other words, in a 3-D mode, the observer perceives the pixels corresponding to both the first and second transmission-zones TZ1 and TZ2, not just one of the first and second transmission-zones TZ1 and TZ2. Therefore, an aperture ratio and brightness is improved. Further, in one of the first and second periods, a white state is displayed in only one of the first and second transmission-zones TZ1 and TZ2. Therefore, a sensory resolution is also improved. As a result, by adequately controlling an area of the first and second transmission-zones TZ1 and TZ2, the observer can see stereo images (i.e., 3-D images) having improved brightness and sensory resolution.

Figure 9:
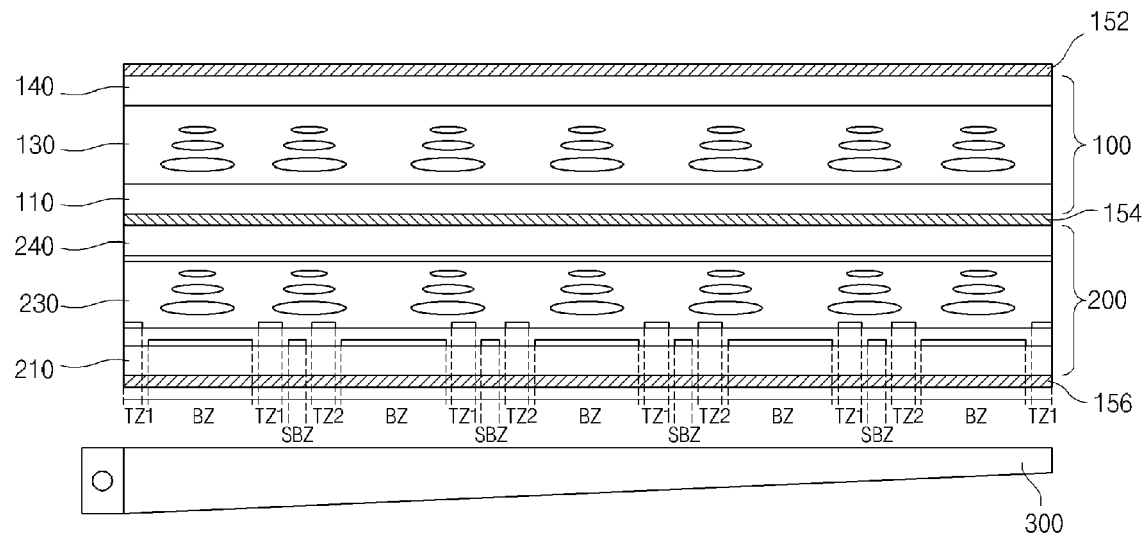
FIG. 9 is a cross-sectional view illustrating a stereoscopic display device according to a second exemplary embodiment of the present invention.

FIG. 9 is a cross-sectional view illustrating a stereoscopic display device according to a second exemplary embodiment of the present invention. As shown in FIG. 9, the parallax barrier liquid crystal panel 200 functions as a component selectively switching the stereoscopic display device between a 2-D mode and a 3-D mode. To achieve this functionality, the parallax barrier liquid crystal panel 200 has a barrier-zone BZ first and second transmission-zones TZ1 and TZ2, and a sub barrier-zone SBZ between the first and second transmission-zones TZ1 and TZ2. When the stereoscopic display device is operated to display images in a 2-D mode, light passes through all the zones of the parallax barrier liquid crystal panel 200, i.e., the barrier-zone BZ, the sub barrier-zone SBZ, and the first and second transmission-zones TZ1 and TZ2. When the stereoscopic display device is operated to display images in a 3-D mode, light alternatingly passes through the first and second transmission-zones TZ1 and TZ2 but not through the barrier-zone BZ and the sub barrier-zone SBZ. Particularly, the barrier-zone BZ and the sub barrier-zone SBZ shield light while each of the first and second transmission-zones TZ1 and TZ2 alternates transmitting and shielding light. Each of the barrier-zone BZ, the sub barrier-zone SBZ, and the first and second transmission-zones TZ1 and TZ2 form a stripe pattern.

Figure 10:
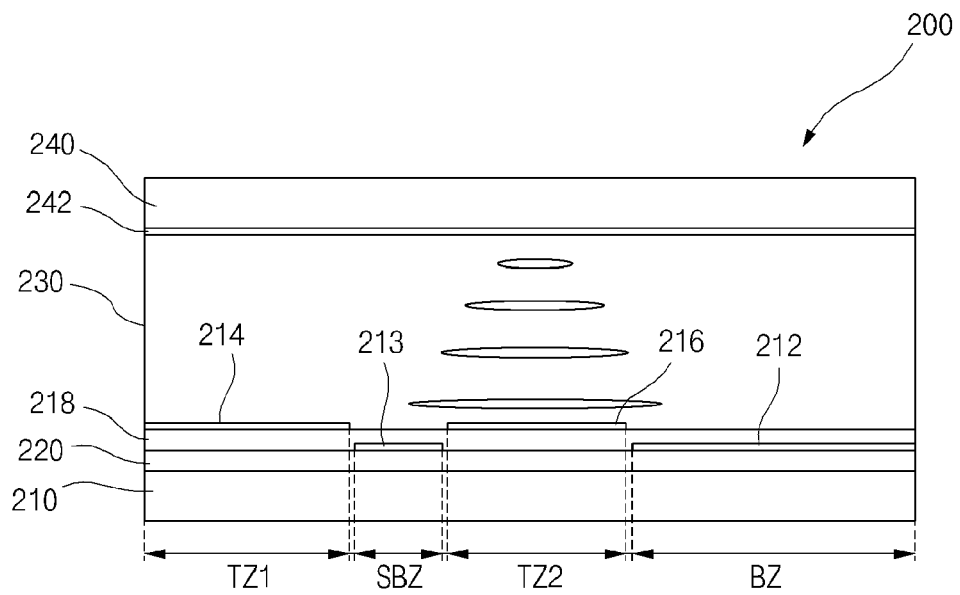
FIG. 10 is an enlarged cross-sectional view of a parallax barrier liquid crystal display panel according to the second exemplary embodiment of the present invention.

FIG. 10 is an enlarged cross-sectional view of portion of the parallax barrier liquid crystal panel according to the second exemplary embodiment of the present invention. As shown in FIG. 10, the parallax barrier liquid crystal panel 200 includes third and fourth substrates 210 and 240, and a second liquid crystal layer 230 between the third and fourth substrates 210 and 240. A barrier electrode 212, a sub barrier electrode 213, and first and second transmission electrodes 214 and 216 are disposed on the third substrate 210. The barrier electrode 212, the sub barrier electrode 213, and the first and second transmission electrodes 214 and 216 correspond to the barrier-zone BZ, the sub barrier-zone SBZ, and the first and second transmission-zones TZ1 and TZ2, respectively. Each the barrier electrode 212, the sub barrier electrode 213, and the first and second transmission electrodes 214 and 216 form a stripe pattern. The first and second transmission electrodes 214 and 216 are disposed on each side portions of the barrier electrode 212. In other words, the first and second transmission electrodes 214 and 216 are disposed between adjacent barrier electrodes 212. A second common electrode 242 is disposed below the fourth substrate 240. Each of the barrier electrode 212, the sub barrier electrode 213, the first and second transmission electrodes 214 and 216, and the second common electrode 242 may be made of a transparent conductive material, such as indium-tin-oxide (ITO) and indium-zinc-oxide (IZO).

When the parallax barrier liquid crystal panel 200 is driven in a normally white (NW) mode, the parallax barrier liquid crystal panel 200 is in a white state in a 2-D mode. When the stereoscopic display device is operated in a 2-D mode, no voltage is not applied to the barrier electrode 212, the sub barrier electrode 213, and the first and second transmission electrodes 214 and 216. Accordingly, the parallax barrier liquid crystal panel 200 has a normally white state, and thus light emitted from the back light 300 is transmitted through the barrier electrode 212, the sub barrier electrode 213, the first and second transmission-zones TZ1 and TZ2. As a result, an observer can see plane images (i.e., 2-D images) on the main liquid crystal panel 100.

On the contrary, when the stereoscopic display device is operated in a 3-D mode, a driving voltage is applied to the barrier electrode 212 and the sub barrier electrode 213. Accordingly, the second liquid crystal layer 230 between the barrier electrode 212 and the sub barrier electrode 213 and the first common electrode 242 is driven, and thus the barrier-zone BZ and the sub barrier-zone SBZ have a black state. Further, a driving voltage is alternatingly applied to the first and second transmission electrodes 214 and 216. Thus, the first and second transmission-zones TZ1 and TZ2 have alternating black states. Preferably, the first and second transmission-zones TZ1 and TZ2 have opposite states to each other. In other words, when the first transmission-zone TZ1 is in a white state, the second transmission-zone TZ2 is in a black state, and vice versa. As a result, an observer can recognize flat images (i.e., 2-D images) on the main liquid crystal panel 100 as stereo images (i.e., 3-D images) by using the parallax barrier liquid crystal panel 200. In a 3-D mode, the barrier-zone BZ and the sub barrier-zone SBZ may have a black state during one frame while the first and second transmission-zones TZ1 and TZ2 may have at least one alternating state.

If the barrier electrode 212, the sub barrier electrode 213, and the transmission electrodes 214 and 216 are disposed in the same layer, the second liquid crystal molecules 230 at a boundary between the barrier electrode 212 and the sub barrier electrode 213, and the transmission electrodes 214 and 216 become abnormally aligned by electric interference therebetween, and thus reducing display quality. Accordingly, a first insulating layer 218 as an inter-layer is disposed between the barrier electrode 212 and the sub barrier electrode 213 and the transmission electrodes 214 and 216. A buffer layer 220 is disposed between the third substrate 210 and the barrier electrode 212 and the sub barrier electrode 213. Though not shown in the drawings, third and fourth alignment layers are formed on the transmission electrodes 216 and 214, and below the second common electrode 242, respectively, to align the second liquid crystal molecules.

In the parallax barrier liquid crystal panel 200 as shown in FIGS. 9 and 10, the barrier electrode 212, the sub barrier electrode 213, and the transmission electrodes 214 and 216 are on the third substrate 210. The transmission electrodes 214 and 216 are formed over the barrier electrode 212 and the sub barrier electrode 213 layer, and the second common electrode 242 is below the fourth substrate 240. However, such vertical position relation of the barrier electrode, the sub barrier electrode, the transmission electrodes and the common electrode as shown in FIG. 10 is one example of a vertical position relation thereof and can therefore be modified.

Figure 11:
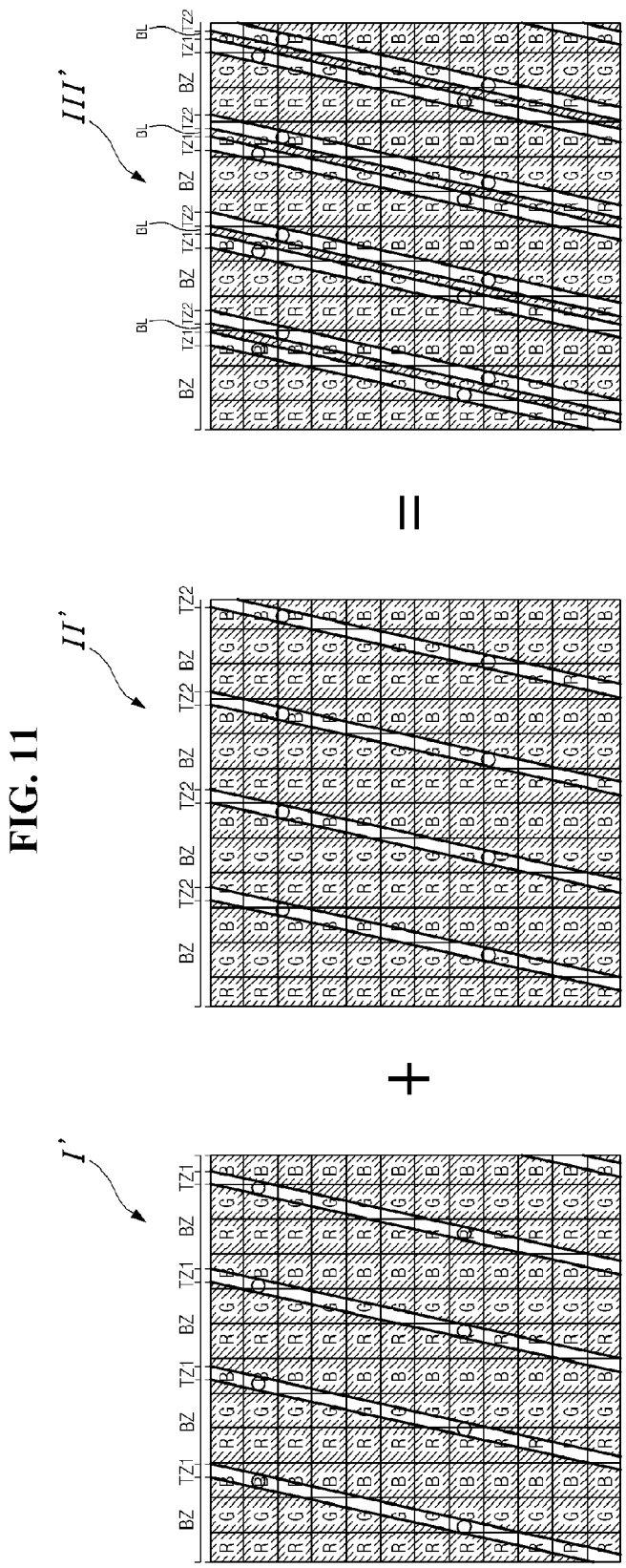
FIG. 11 is a conceptual view illustrating screens in a 3-D mode of a stereoscopic display device according to the second exemplary embodiment of the present invention.

FIG. 11 is a conceptual view illustrating screens displayed during operation of a stereoscopic display device according to the second exemplary embodiment of the present invention in a 3-D mode. As shown in FIG. 11, I', II', and III' represent first, second, and third screens, respectively. The first screen I' is displayed in a first period when a first transmission-zone TZ1 has a white state, and a second transmission-zone TZ2 has a black state. The second screen II' is displayed in a second period when the first transmission-zone TZ1 has a black state, and the second transmission-zone TZ2 has a white state. The third screen III' is a mixed screen of the first and second screens I' and II' perceived by an observer. With respect to the number (or areas) of red (R), green (G), and blue (B) pixels having white states, the third screen III' has pixels in the white state about by two times more than the first or second screen I' or II'. In other words, in a 3-D mode, the observer perceives the pixels corresponding to both the first and second transmission-zones TZ1 and TZ2, not just one of the first and second transmission-zones TZ1 and TZ2. Therefore, an aperture ratio and brightness is improved. Further, in one of the first and second periods, a white state is displayed in only one of the first and second transmission-zones TZ1 and TZ2. Therefore, sensory resolution is also improved. Additionally, the shape of the white state displayed in the first and second transmission-zones TZ 1 and TZ2 is divided by the sub barrier-zone SBZ. Therefore, sensory resolution is further improved over the first exemplary embodiment. As a result, by adequately controlling an area of the first and second transmission-zones TZ1 and TZ2, the observer can see stereo images (i.e., 3-D images) having improved brightness and sensory resolution.

Figure 12:
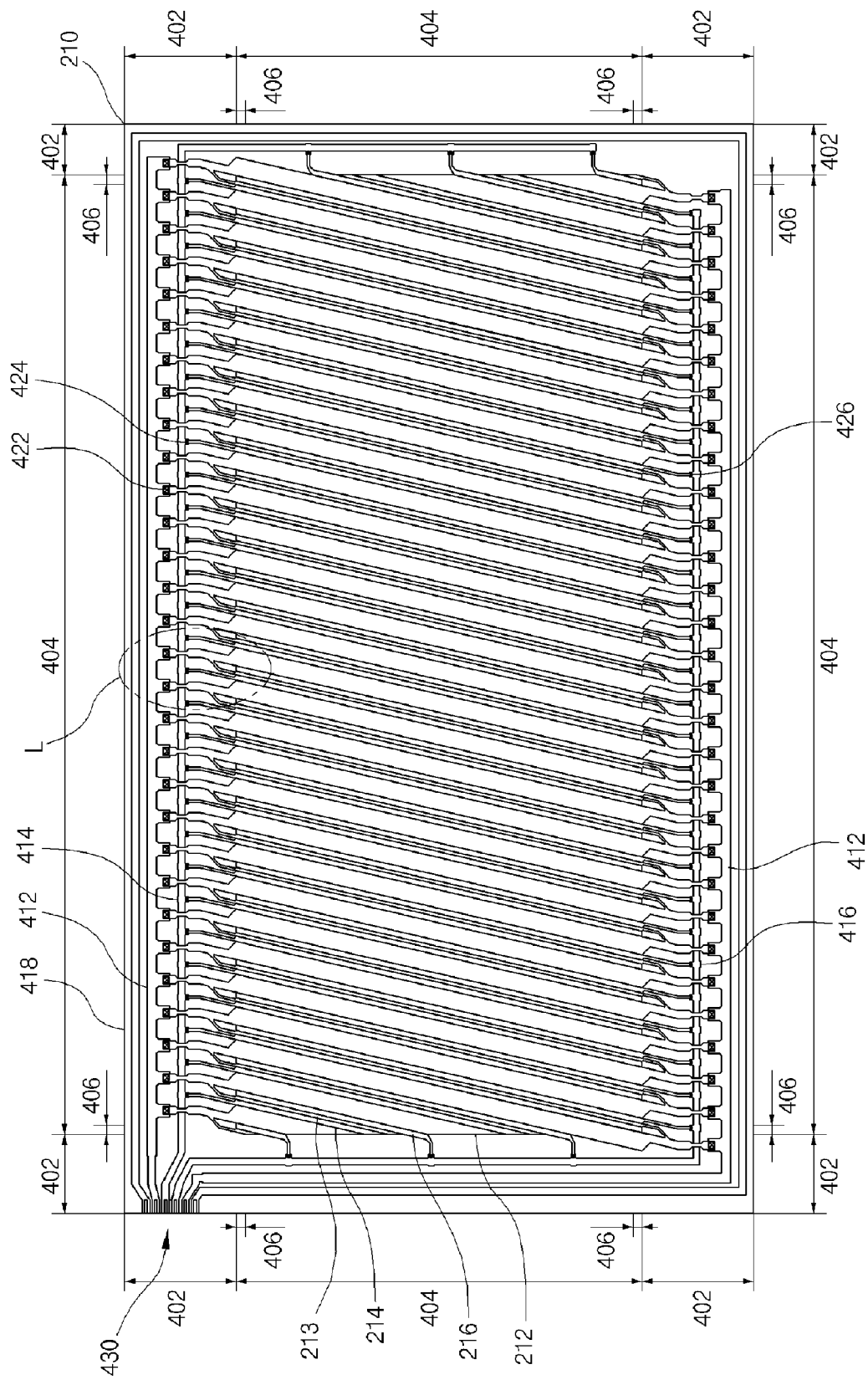
FIG. 12 is a plan view illustrating a substrate of a parallax barrier liquid crystal panel according to the second exemplary embodiment of the present invention.

Now, detailed exemplary structure of the parallax barrier liquid crystal panel according to the present invention will be illustrated. FIG. 12 is a plan view illustrating an exemplary third substrate 120 of a parallax barrier liquid crystal panel 200 according to the second exemplary embodiment of the present invention. Though only the parallax barrier liquid crystal panel according to the second exemplary embodiment is illustrated, a person of ordinary skill in the art will understand that the parallax barrier liquid crystal panel according to the first exemplary embodiment can be adapted in the same manner.

As shown in FIG. 12, the third substrate 210 of the parallax barrier liquid crystal panel 200 is divided into an active region 404 and a non-active region 402 surrounding the active region 404. The non-active region 402 includes lines for supplying a driving voltage with different timings to a barrier electrode 212, a sub barrier electrode 213, and first and second transmission electrodes 214 and 216, in a 3-D mode. The active region 404 includes the barrier electrode 212 corresponding to a barrier-zone BZ, the sub barrier electrode 213 corresponding to a sub barrier-zone SBZ, and the first and second transmission electrodes 214 and 216 corresponding to first and second transmission-zones TZ1 and TZ2, respectively. In other words, the non-active region 402 includes a first line 412 transmitting the driving voltage to the barrier electrodes 212 and the sub barrier electrodes 213 diverged from the barrier electrodes 212, second and third lines 414 and 416 transmitting the alternating driving voltage to the first and second transmission electrodes 214 and 216, respectively, and a common line 418 transmitting the driving voltage to a second common electrode 242 (FIG. 9 and FIG. 10).

For exemplary purposes only, the common line 418 may be located in the most exterior periphery of the non-active region 402, and the two first lines 412 may be located inside the common line 418 along the two major axis of the third substrate 210, respectively. The second line 414 may be located inside the first line 412 along a minor axis from a major axis, and the third line 416 may be located corresponding to the second line 414 along a minor axis from a major axis. The barrier electrode 212 and the sub barrier electrode 213, and the first and second transmission electrodes 214 and 216 may be formed in layers different from each other, in order to decrease electric interference. The barrier electrode 212 (and the sub barrier electrode 213) and the first and second transmission electrodes 214 and 216 are connected to the first, second, and third lines 412, 414, and 416 through first, second, and third contact holes 422, 424, and 426, respectively.

Figure 13:
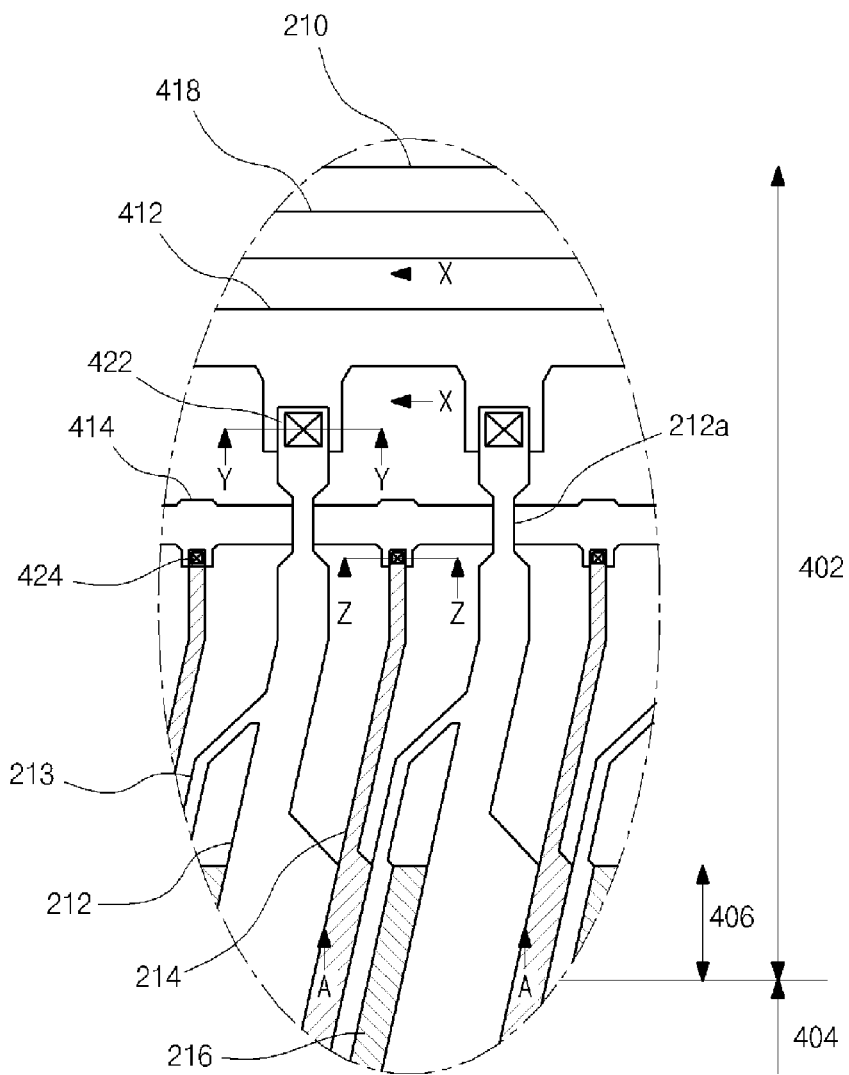
FIG. 13 is a plan view enlarging portion L of FIG. 12.
Figure 14A:
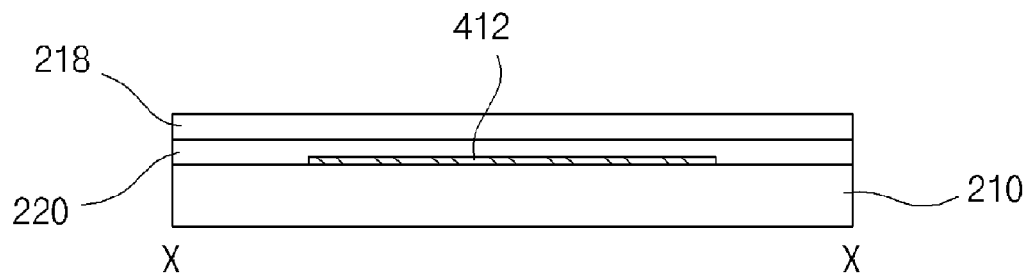
FIGS. 14A to 14C are cross-sectional views according to cutting-plane lines of X-X, Y-Y, Z-Z of FIG. 13, respectively.
Figure 14B:
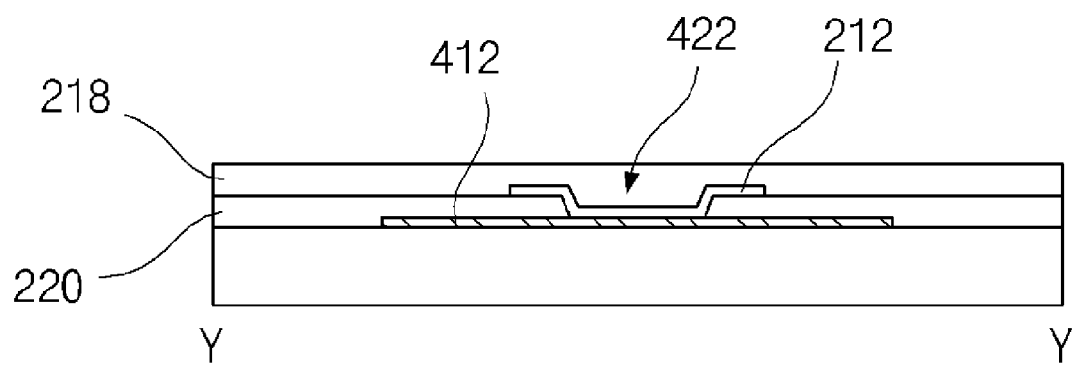
Figure 14C:
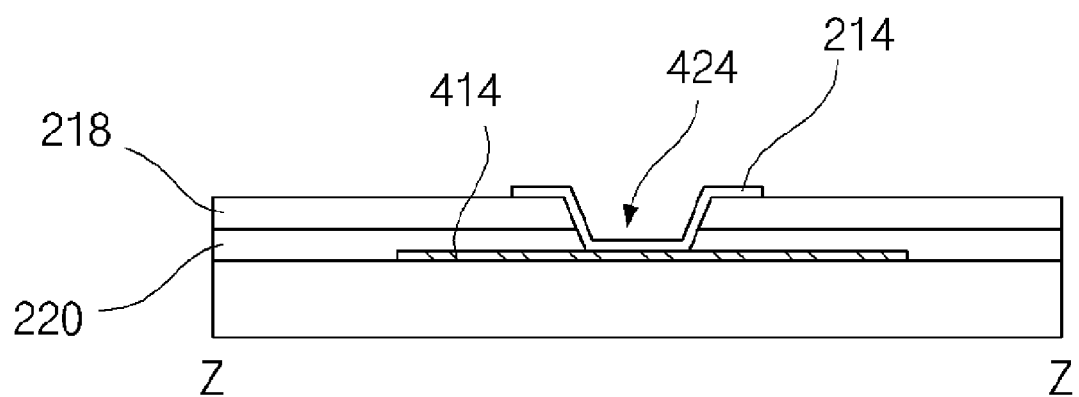

FIG. 13 is an enlarged plan view of portion L in FIG. 12, and FIG. 14A to 14C are cross-sectional views according to cutting-plane lines X-X, Y-Y, and Z-Z of FIG. 13, respectively. The first and second lines 412 and 414 are disposed on the third substrate 210 as shown in FIG. 13. It is understood that first and third lines 412 and 414, though not shown in FIG. 13, are disposed in the same manner on the opposite side of the third substrate 210 as shown in FIG. 12. The first and second insulating layers 220 and 218 cover the first line 412 in turn, as shown in FIG. 14A. As shown in FIG. 14B, the first line 412 is connected to the barrier electrode 212 and the sub barrier electrode 213 through the first contact hole 422 formed by passing through a first insulating layer 220. The second insulating layer 218 covers the barrier electrode 212 and the sub barrier electrode 213. As shown in FIG. 14C, the second line 414 is connected to the first transmission electrode 214 through the second contact hole 424 formed by passing through first and second insulating layers 220 and 218. Though not shown in the drawings, the third line 416 may be connected to the second transmission electrode 216 through a third contact hole formed by passing through the first and second insulating layers 220 and 218 in the same manner as shown in FIG. 14C for the second line 414. Preferably, the first, second, and third lines 412, 414, and 416, and the common line 418 are made of a low resistance metal to prevent signal delay. Since these lines are located in the third substrate 210 unrelated to the main display panel, it is preferred that the lines are made of an opaque metal, such as Al or an alloy of Al. On the other hand, the barrier electrode 212 and the sub barrier electrode 213, and the first and second transmission electrodes 214 and 216 are preferably made of a transparent conductive material, such as indium-tin-oxide (ITO) and indium-zinc-oxide (IZO).

Though each location of the lines may be changed, overlap of electrodes and lines may occur. For instance, the barrier electrodes 212 and the second and third lines 414 and 416 respectively cross each other with the second insulating layer 218 disposed between the barrier electrodes 212 and the second and third lines 414 and 416 at the crossing portions, as shown in FIGS. 12 and 13. Accordingly, an electrostatic capacity can occur due to parasitic capacitance. To solve these disadvantages, an overlapped area is preferably made small by reducing the width of the barrier electrode 212 to a minimum at the crossing portions. For example, electrode 212 has a neck shape in the crossing portion 212A, as shown in FIG. 13.

Since the parallax barrier liquid crystal panel 200 may be disposed between the main liquid crystal panel 100 and the backlight 300, a display region of the main liquid crystal panel 100 is located within an active region 404 of the parallax barrier liquid crystal panel 200 such that 2-D and 3-D images may be displayed through an entire surface of the main liquid crystal panel 100. Accordingly, the area of the active region 404 is preferably designed to be larger than the display region of the main liquid crystal panel 100. A margin region 406 surrounding an exterior periphery of the active region 404 is also defined. The barrier electrode 212, the sub barrier electrode 213, and the first and second transmission electrodes 214 and 216 are then disposed over the entire area of the active region 404 including the margin region 406. The margin region 406 prevents decrease in the display region of the main liquid crystal panel 100 due to slight misalignments between the main liquid crystal panel 100 and the parallax barrier liquid crystal panel 200. For example, the width of the margin region 406 may be within the range of 0.4 mm to 0.6 mm, preferably about 0.5 mm.

As shown in FIG. 12, a driving voltage transmitted through the first, second, and third lines 412, 414, and 416, and a common voltage transmitted through the common line 418 are supplied by an exterior circuit (not shown). A flexible printed circuit (FPC) electrode pad 430 connecting the exterior circuit to the first, second, and third lines 412, 414, and 416, and the common line 418 is formed in the edge of the non-active region 402. The FPC electrode pad 430 may be formed during the same fabricating processes using the same materials as the first, second, and third lines 412, 414, and 416, and the common line 418. The FPC electrode pad 430 acts as a transmitting site of a driving voltage and a common voltage, and when connected to a shorting bar, the FPC electrode pad 430 prevents static electricity from being generated during the fabricating process of the parallax barrier liquid crystal panel 200.

The third and fourth substrates 210 and 240 of the parallax barrier liquid crystal panel 200 according to the exemplary embodiments of the present invention are formed using a fabricating process similar to that of a general liquid crystal panel. In other words, respective elements of the third and fourth substrates 210 and 240 are formed on the first and second large substrates, respectively. Then, a liquid crystal layer is disposed between the first and second large substrates after first and second large substrates are attached facing each other. Then, the first and second large substrates are scribed along a respective cell to form a plurality of parallax barrier liquid crystal display panels 200. Further, a shorting line connecting all the FPC electrode pads 430 is formed on the first large substrate in order to maintain an equivalent electric potential of the first, second, and third lines 412, 414, and 416, the common line 418, the barrier electrode 212, the sub barrier electrode 213, the first and second transmission electrodes 214 and 216, and the second common electrode 242. As a result, a short that may occur between each the electrodes or the lines may be prevented. The shorting line is removed along the cutting-plane line during the final scribing process.

Figure 15:
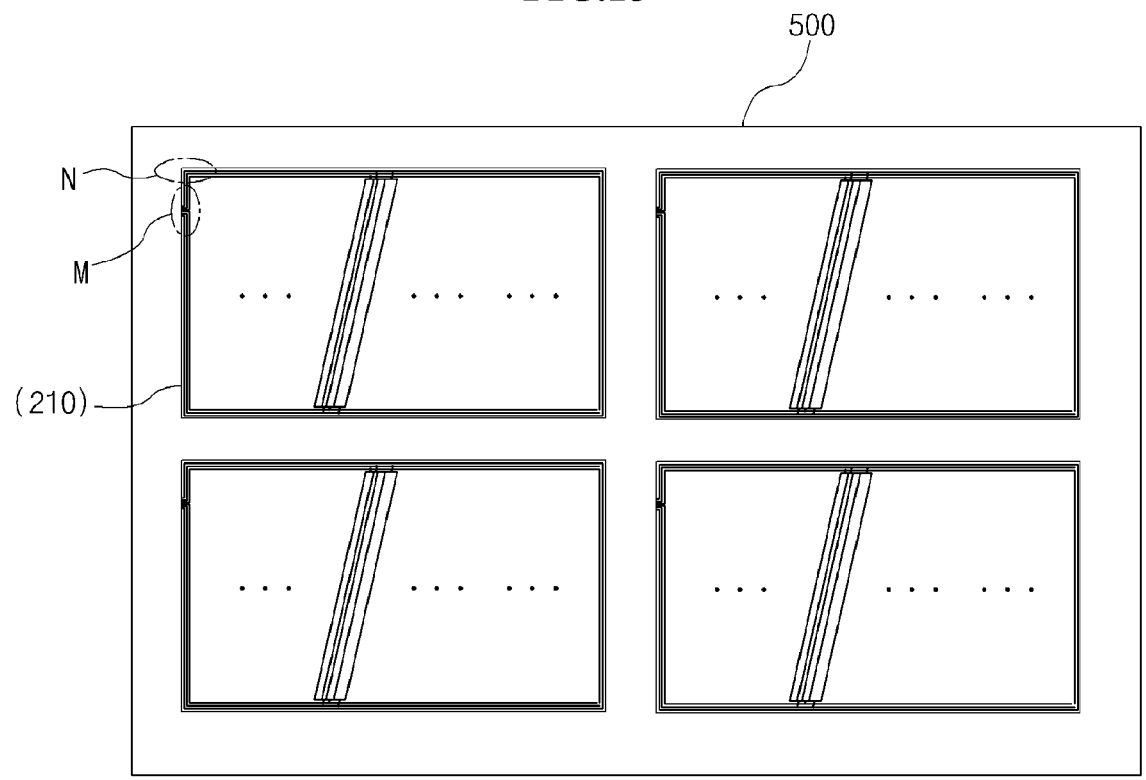
FIG. 15 is a general view illustrating a substrate during fabrication of the parallax barrier liquid crystal panel according to the exemplary embodiments of the present invention.
Figure 16:
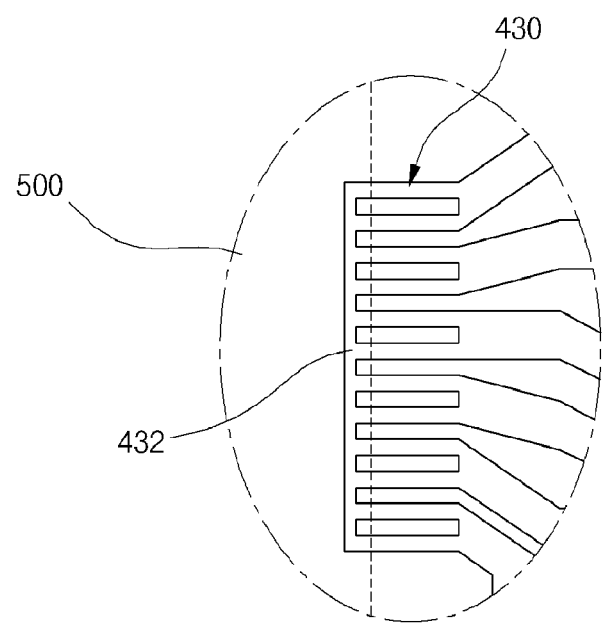

FIG. 15 is a general view illustrating a first large substrate to explain a fabrication method of the parallax barrier liquid crystal panel according to the exemplary embodiments of the present invention. FIG. 16 is an enlarged plan view of portion M (FPC electric pad 430) of FIG. 15.

As shown in FIG. 16, a shorting line 432 connecting FPC electrode pads 430 is formed in the exterior of a cutting-plane line on the first large substrate 500. By cutting the third substrate 210 along the cutting-plane line, the shorting line 432 is eliminated during a final scribing process.

A first large substrate 500 formed having respective elements of the third substrate 210 and a second large substrate (not shown) formed having respective elements of the fourth substrate 240 are attached facing each. Then, first and second scribing keys indicating each cutting-plane lines of the first and second large substrates may be formed during a scribing process to divide the first and second large substrates into separate cells. In particular, the first and second scribing keys may be formed using the same process and materials for forming the first, second, and third lines 412, 414, and 416, and the common line 418 on the first large substrate 500. Because opaque elements such as a black matrix and color filters are not formed on the fourth substrate 240 of the parallax barrier liquid crystal panel 200 according to the exemplary embodiments of the present invention, the first and second scribing keys indicating each cutting-plane lines of the first and second large substrates may be the same. As a result, a separate mask process may be omitted.

FIG. 17 is an enlarged plan view of portion N illustrating forming first and second scribing keys of FIG. 15. As shown in FIG. 17, the first scribing key 442 indicating a cutting-plane line of the third substrate 210 and the second scribing key 444 indicating a cutting plane line of the fourth substrate 240 are formed in a non-active region 402 of the third substrate 210.

A fabrication process of the parallax barrier liquid crystal panel according to the exemplary embodiments of the present invention will be illustrated with respect to FIGS. 12 to 17. Respective elements of a third substrate 210 are formed on a first large substrate 500. In particular, a thin film of metal having low resistance, e.g., Al or an alloy of Al, is disposed on the first large substrate 500, and then a photoresist is spread on the thin film. Then, a selected portion of the thin film is exposed by using a first mask having a specified pattern to develop the photoresist. A thin film pattern is formed by etching the exposed portions. As a result, first, second, and third lines 412, 414, and 416, a common line 418, a FPC electrode pad 430, a shorting line 432, and first and second scribing keys 442 and 444 are formed on the third substrate 210. Then, residual photoresist is eliminated.

The first insulating layer 220 is formed on the first large substrate 500 having the first, second, and third lines 412, 414, and 416, and so on. Then, a first contact hole 422 exposing the first line 412 is formed by photolithography using a second mask and etching. Then, a transparent ITO film is disposed on the first insulating layer 220 having the first contact hole 422. A barrier electrode 212 is then connected to the first line 412 through the first contact hole 422, and a sub barrier electrode 213 diverging from the barrier electrode 212 is formed by a third mask. The barrier electrode 212 is formed having a neck shape 212A at a crossing point the barrier electrode 212 and the second and third lines 414 and 416. Then, a second insulating layer 218 is disposed on the first large substrate 500 having the barrier electrode 212 and the sub barrier electrode 213. Second and third contact holes 424 and 426 exposing the second and third lines 414 and 416 are then formed passing through the first and second insulating layers 220 and 218 by a fourth mask. The FPC electrode pad 430 may be exposed in the exterior of the first large substrate 500. Then, the ITO thin film is disposed on the second insulating layer 218, and then first and second transmission electrodes 214 and 216 connecting to the second and third lines 414 and 416 through the second and third contact holes 424 and 426, respectively, are formed by a fifth mask. The second large substrate (not shown) having a second common electrode 242 may be formed in a separate process.

The first and second large substrates are attached facing each other, and a second liquid crystal layer 230 is disposed between the first and second large substrates. Respective seal patterns may be formed along the edge of one of the third and fourth substrates 210 and 240, respectively, in order to attach the first and second large substrates together. The second liquid crystal layer 230 may be disposed between the first and second large substrates by a vacuum injection type, and may be made of conductive materials such as Ag dot and the like, in order to electrically connect the common line 418 of the third substrate 210 and the second common electrode 242 of the fourth substrate 240. Then, the first large substrate 500 is cut along a first scribing key 442 formed on the first large substrate 500, removing the shorting line 432 connecting the FPC electrode pad 430 in the same process. The second large substrate (not shown) is cut along a second scribing key 444 formed on the first large substrate 500. As a result, the parallax barrier liquid crystal panel 200 according to the exemplary embodiments of the present invention is formed.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. A stereoscopic display device, comprising:
   a liquid crystal panel;
   parallax barrier liquid crystal panel including:
      a first substrate including an active region and a non-active region,
      a second substrate facing the first substrate,
      first, second, and third conductive lines in the non-active region,
      at least one barrier electrode in the active region and connected to the first line,
      at least one pair of first and second transmission electrodes disposed adjacent to the barrier electrode and connected to the second and third lines, respectively,
      a first insulator between the first, second, and third lines and the barrier electrode, wherein the first insulator includes a first contact hole connecting the first line and the first barrier electrode,
      a second insulator between the barrier electrode and the first and second transmission electrodes, wherein the second insulator includes a second contact hole connecting the second line and the first transmission electrode and a third contact hole connecting the third line and the second transmission electrode,
      a common electrode on the second substrate, and
      a liquid crystal layer between the first and second substrates; and
   a control circuit for selectively driving the stereoscopic display device in one of a two-dimensional (2-D) mode and a three-dimensional (3-D) mode, wherein
      the 2-D mode is selected when no driving voltage is applied to the first, second, and third lines, thereby placing the barrier electrode and the first and second transmission electrodes in a white state, and
      the 3-D mode is selected when a driving voltage is applied to the first line and alternatingly applied to the second and third lines, thereby placing the barrier electrode in a black state, and placing the first and second transmission electrodes alternating between a black state and a white state.

2. The stereoscopic display device according to claim 1, wherein the parallax barrier liquid crystal panel further comprising at least one sub-barrier electrode, the sub-barrier electrode disposed between the first and second transmission electrodes and connected to the first line, whereby the barrier electrode and the sub barrier electrode are driven together by control circuit.

3. The stereoscopic display device according to claim 1, wherein the first transmission electrode and the second transmission electrode have opposite states in a driving period in the 3-D mode.

* * * * *